Sept. 6, 1955  G. F. SOUCY  2,717,183
POWER TAKE-OFF SHAFT AND BEARING FOR HIGH SPEED MOTORS
Filed Sept. 24, 1953

Inventor:
Guilbert F. Soucy,
by Andros and Smith
His Attorneys.

United States Patent Office 2,717,183
Patented Sept. 6, 1955

2,717,183

POWER TAKE-OFF SHAFT AND BEARING FOR HIGH SPEED MOTORS

Guilbert Francis Soucy, Cohoes, N. Y.

Application September 24, 1953, Serial No. 382,140

3 Claims. (Cl. 308—77)

This invention relates to improvements in take-off shafts for high speed motors and novel bearing arrangements therefor, having particular reference to such a device utilizing mercury under pressure as a lubricant therein, and the provision of such an arrangement is the principal object of the invention.

Specifically, it is an object of the invention to provide a power take-off shaft for such a motor and a hermetically sealed bearing for the shaft having a substantially enlarged cylindrical bearing portion, the bearing constituting a sleeve to accommodate the enlarged portion of the shaft with means secured to the ends of the sleeve for encasing the same, a fluid cooling jacket for the bearing sleeve, and suitable means containing mercury communicating with the bearing sleeve and the enlarged bearing portion of the shaft supplying mercury thereto as a lubricant, under pressure at least of the weight of the mercury to expel air from the bearing.

Other specific objects of the invention are the provision of such a power take-off shaft and bearing in which the enlarged cylindrical bearing portion is provided with peripheral openings therein containing mercury; preferably, in which the cylindrical portion constitutes a separate bearing mounted on the shaft and suitably keyed thereto; in which the bearing portion is provided with edge notches in order centrifugally to force any of the mercury back along an intermediate portion of the bearing to prevent the escape thereof; and in which the fluid cooling means comprises a water jacket and means to circulate water around the jacket.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which.

Figure 1:
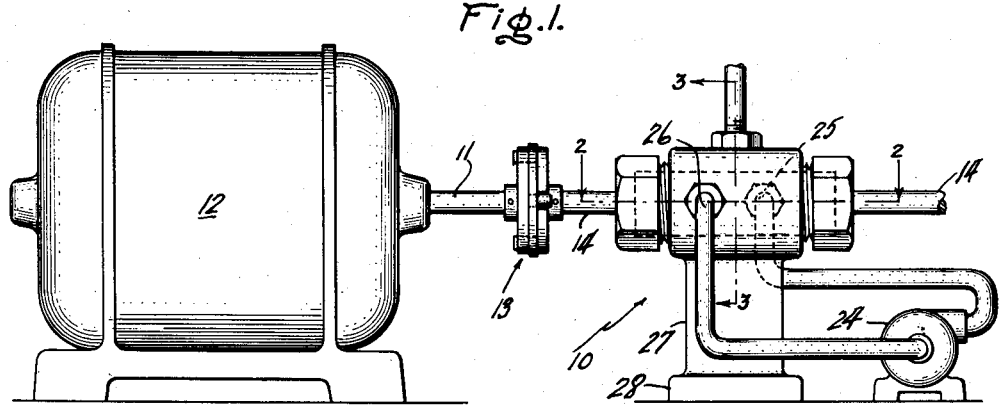
Fig. 1 is a side elevational view illustrating a preferred arrangement of the invention connected to a driving motor.
Figure 2:
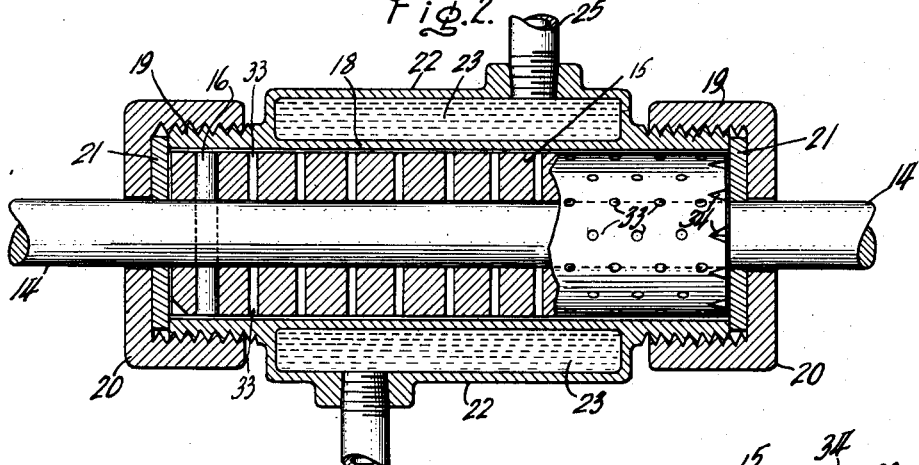
Fig. 2 is a transverse sectional view, somewhat enlarged, showing portions broken away, taken along the line 2—2 of Fig. 1 and looking in the direction of the arrows.

Referring more particularly to the drawing, there is indicated generally at 10 a power take-off shaft and bearing arrangement connected to the driving shaft 11 of an electric motor 12 by means of a conventional coupling indicated generally at 13.

Figure 4:
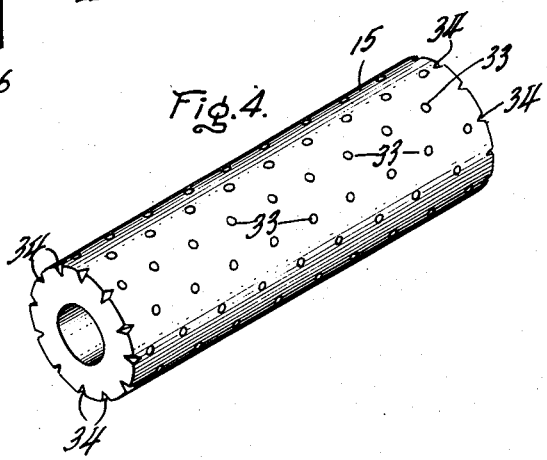
Fig. 4 is a perspective view of a preferred form of a rotatable bearing portion.

Preferably, a power take-off shaft is connected to the coupling 13 and is provided with an enlarged cylindrical bearing portion which may be integral with the shaft. However, I prefer to use a separate cylindrical bearing portion of the type shown at 15 (Fig. 4) which is keyed to the shaft in any suitable manner such as, for example, by means of a pin 16.

The bearing comprises a bearing sleeve 18 which is commensurate in length with the bearing portion 15.

At opposite ends thereof the bearing sleeve is screw-threaded as at 19 to receive screw-threaded caps or bonnets 20, each of which is provided with a suitable sealing member 21 in abutting relation between the caps and ends of the bearing sleeve 18.

Surrounding the bearing is a suitable cooling jacket 22 containing a cooling medium, such as, for example, water indicated at 23, although it will be understood that any other suitable cooling medium may be utilized. A circulating pump 24, having inlet and outlet ports 25 and 26 respectively, are connected on opposite sides of the cooling jacket 22.

The bearing may be mounted on any suitable means, such as, for example, a standard 27 and base 28.

Figure 3:
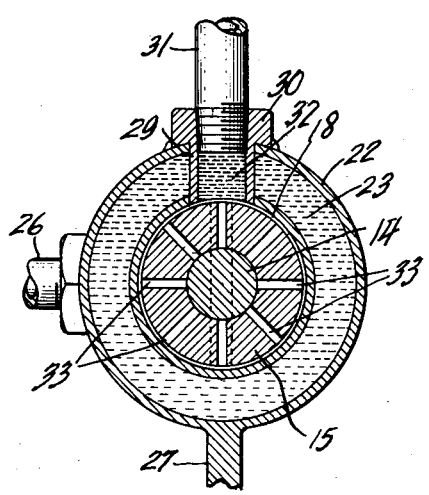
Fig. 3 is a vertical transverse sectional view, somewhat enlarged, with parts broken away, taken along the line 3—3 of Fig. 1 and looking in the direction of the arrows.

As clearly shown in Fig. 3, the jacket 22 and the bearing sleeve 18 have aligned openings therein substantially centrally of the top of the bearing and tightly fitted therein is a small conduit, or nipple, 29 preferably having an enlarged head 30.

Preferably screw-threaded into the nipple is a pipe 31 which supports a column of mercury 32 from any suitable source of supply (not shown).

The enlarged cylindrical bearing portion 15 has a plurality of suitable spaced-apart openings 33 around the surface thereof inwardly extending therethrough, although such openings may be of shallower depth. Around each peripheral edge of the cylindrical portion 15 are spaced notches 34.

After the bearing has been assembled, mercury is run into the pipe 31 until it fills the openings 32, the space in the cylinder portion 15 and the bearing 18, and a column of mercury remains in the nipple 29 and pipe 31. This will dispel all the air from within the bearing so that it is substantially hermetically sealed.

The enlarged cylindrical portion 15 on the shaft 14 will thus always be revolving in a film of mercury, the only possible escape being between the gasket members 21 and the bonnets 20. However, because of the notches 34, the speed of rotation will cause the mercury to be worked back toward the center of the cylinder portion and away from the sealing end members.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. The combination of a power take-off shaft for a high speed motor and a hermetically sealed bearing for said shaft, which shaft has a substantially enlarged cylindrical bearing portion provided with peripheral edge notches; said bearing comprising a bearing-sleeve for said enlarged bearing portion; means encircling said shaft and secured to the ends of said bear-sleeve for encasing and sealing said enlarged cylindrical bearing portion; fluid cooling means encircling said bearing-sleeve; and means containing mercury communicating with said bearing-sleeve and said enlarged bearing portion for supplying mercury thereto, as a lubricant, under pressure, and to expel air therefrom; whereby centrifugal action of said shaft, because of said edge notches on said enlarged bearing portion, will force said mercury back from the ends of said bearing and away from said end sealing means.

2. The combination of a power take-off shaft for a high speed motor and a hermetically sealed bearing for said shaft, which shaft has a substantially enlarged bearing portion provided with peripheral edge notches at opposite ends thereof, and a plurality of openings therebetween around its longitudinal peripheral surface to form wells; said bearing comprising a bearing-sleeve for said enlarged bearing portion; means encircling said shaft and secured to the ends of said bearing-sleeve for encasing and sealing said enlarged cylindrical bearing portion; fluid cooling means encircling said bearing-sleeve; and means containing mercury communicating with said bearing-sleeve and said enlarged bearing portion for supplying mercury thereto, and to said wells, as a lubricant, under pressure, and to expel air therefrom; whereby centrifugal action of said shaft will urge mercury from said wells between said bearing and said enlarged bearing portion, but, because of said edge notches on said enlarged bearing portion, will force said mercury back from the ends of said bearing and away from said end sealing means.

3. The combination of a power take-off shaft for a high speed motor and a hermetically sealed bearing for said shaft, which shaft has a substantially enlarged cylindrical bearing portion provided with peripheral edge notches; said bearing comprising a bearing-sleeve for said enlarged bearing portion; means encircling said shaft and secured to the ends of said bearing-sleeve for encasing and sealing said enlarged cylindrical bearing portion; water cooling means, including a water jacket for said bearing and a pump to circulate water therein; and means containing mercury communicating with said bearing-sleeve and said enlarged bearing portion for supplying mercury thereto, as a lubricant, under pressure, and to expel air therefrom; whereby centrifugal action of said shaft, because of said edge notches on said enlarged bearing portion, will force said mercury back from the ends of said bearing and away from said end sealing means.

References Cited in the file of this patent

UNITED STATES PATENTS

| | | |
|---|---|---|
| 165,397 | Williams | July 6, 1875 |
| 418,123 | Grimm | Dec. 24, 1889 |
| 1,295,974 | Wilson | Mar. 4, 1919 |
| 1,728,434 | Montreuil | Sept. 17, 1929 |